UNITED STATES PATENT OFFICE.

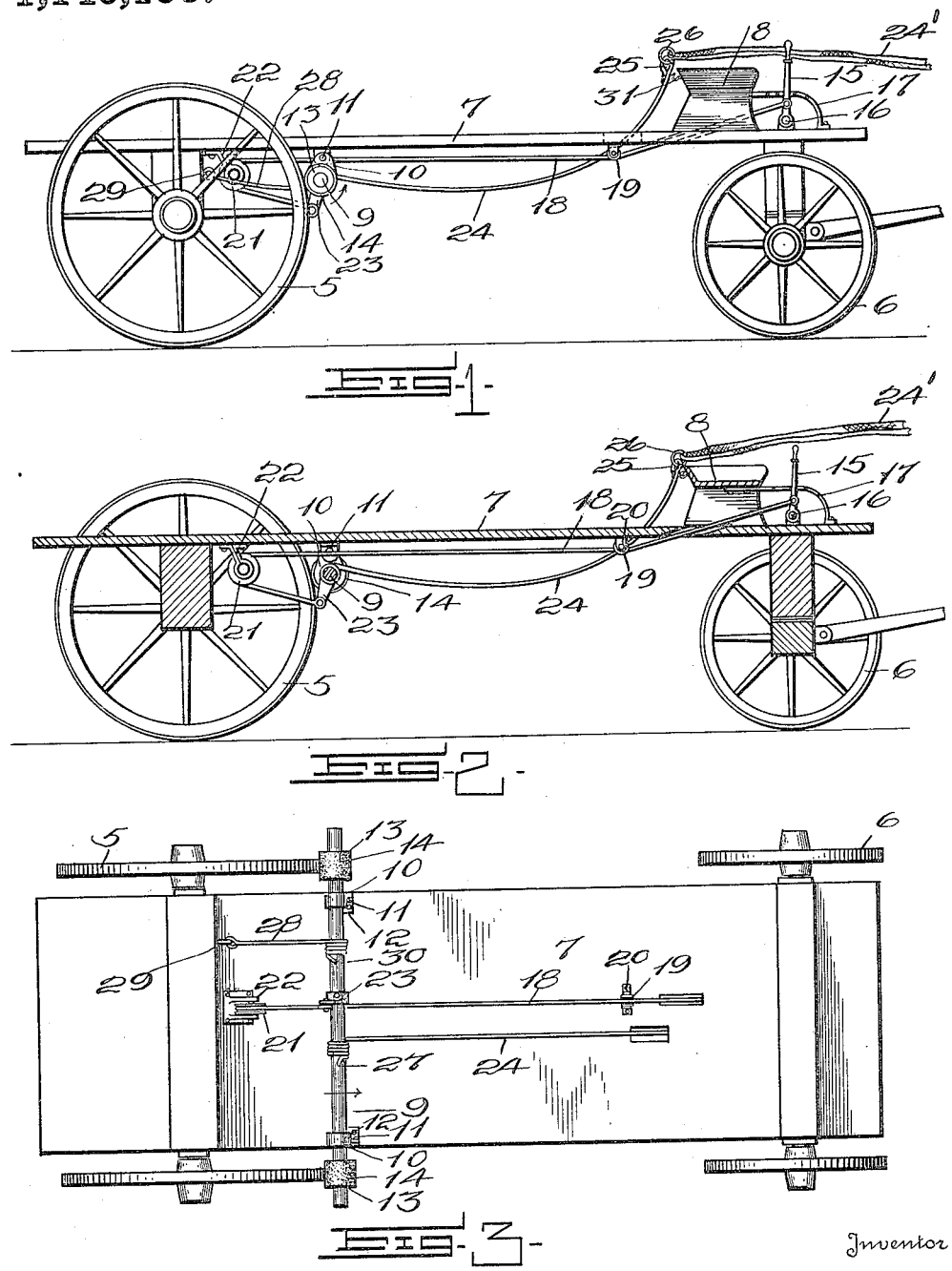

CHAUNCEY M. SINGLETON, OF LINCOLN, NEBRASKA.

COMBINED WAGON-BRAKE AND HORSE-HITCHING APPARATUS.

1,140,195.  Specification of Letters Patent.  Patented May 18, 1915.

Application filed July 7, 1914. Serial No. 849,384.

*To all whom it may concern:*

Be it known that I, CHAUNCEY M. SINGLETON, a citizen of the United States, residing at Lincoln, in the county of Lancaster and State of Nebraska, have invented certain new and useful Improvements in Combined Wagon-Brake and Horse-Hitching Apparatus, of which the following is a specification.

My invention relates to a combined wagon brake and horse hitching apparatus.

An important object of the invention is to provide apparatus of the above-mentioned character, having means to apply brakes to the wheels of the wagon, and to pull upon the lines of reins, to hold the horse if he attempts to move forwardly, when left with the wagon at rest.

A further object of the invention is to provide means for automatically increasing the application of the brakes, when the horse backs with the brakes applied, and simultaneously releasing the pull upon the lines, whereby the backing of the horse is stopped.

A further object of the invention is to provide means of the above-mentioned character which may be operated as an ordinary brake, when the wagon is running down hill.

A further object of the invention is to provide apparatus of the above-mentioned character which is simple in construction, inexpensive to manufacture, convenient in use and may be applied to wagons of different types, without materially altering the construction thereof.

Other objects and advantages of this invention will be apparent during the course of the following description.

In the accompanying drawings forming a part of the specification and in which like numerals are employed to designate like parts throughout the same, Figure 1 is a side elevation of apparatus embodying my invention applied to a wagon; Fig. 2 is a central longitudinal sectional view, showing parts of the apparatus in section and parts in elevation, and Fig. 3 is a bottom plan view of the wagon equipped with the apparatus.

In the drawings wherein for the purpose of illustration is shown the preferred embodiment of my invention the numeral 5 designates the rear wheels of a wagon, and the numeral 6 the forward wheels, connected with and supporting in any well known or preferred manner, a wagon body 7, of any well known or preferred type. Arranged upon the forward portion of the body 7 is a seat 8, as shown.

My brake apparatus embodies a transverse rotatable shaft 9, arranged below the body 7 forwardly of and adjacent the rear wheels 5. This transverse shaft 9 is journaled through vertically swinging bearings 10, which are pivoted at 11 to brackets 12, rigidly secured to the lower surface of the body 7. While the shaft 9 is free to rotate it cannot move perceptibly longitudinal with relation to its bearings. Rigidly mounted upon the outer ends of the transverse shaft 9 are friction brake pulleys or wheels 13, of any well known or preferred type, the same preferably having their peripheries covered with a fibrous material 14, such as leather, canvas or the like. The friction brake pulleys 14 are preferably longitudinally adjustably mounted upon the shaft 9, so that they may be arranged to engage the wheels 5. By virtue of the vertically swinging bearings 10 the brake pulleys 13 may be moved into and out of engagement with the rear wheels 5.

Manually operated means are provided for applying the brake by moving the brake pulleys 13 into frictional engagement with the rear wheels 5 including a lever 15, preferably arranged forwardly of the seat 8 in suitable reach of the operator and pivoted at 16. This lever is arranged in proximity to a toothed segment 17, with which it engages to be locked in a desired angular position. Attached to the lever 15 near its pivot, is a flexible element or cable 18, passing through an opening in the body 7 and engaging a forward pulley 19, secured to the lower surface of the body 7 by a bracket 20. The cable 18 extends rearwardly beyond the transverse shaft 9 and engages a pulley 21, carried by a bracket 22, arranged below and rigidly secured to the body 7. The lower turn of the cable of the flexible element 18 then extends forwardly and is attached to the outer end of a crank or link 23 pivotally secured to the transverse shaft 9 whereby the shaft 9, may rotate therein. It is obvious that by swinging the lever 15 forwardly, the bearings 10 will be swung rearwardly, moving the brake pulleys 13 into rolling clamping engagement with the wheels 5, serving to wholly or partly prevent rotation thereof.

Means are provided, operated by the transverse shaft 9, to draw upon the lines or reins 24, to check the horse in the event that he attempts to move forwardly with the brakes applied, as above indicated. Such means includes a line flexible element or cable 24, provided at its forward end with the hook 25, to detachably engage with the ring 26 carried by the rear end of the lines or reins 24'. The flexible element or cable 24 is passed through an opening formed in the body 7, and is attached to the transverse shaft 9, at 27, and is adapted to be wound upon the shaft when the shaft is rotated by the rear wheels 5 upon the forward movement of the wagon. It is obvious that if the horse should start to move forwardly and if the brakes were not sufficiently applied to prevent such movement, the rear wheels 5 would turn, turning the brake pulleys 13 counterclockwise, and winding the flexible element or cable 24 upon the shaft 9, whereby this flexible element would pull rearwardly upon the lines 24', thus checking the horse, and causing the friction brake pulleys to stop rotating and slip upon the wheels 5.

When the lines 24' are pulled rearwardly, as above indicated, it may start the horse backing. To prevent this I provide means to increase the application of the brakes, and simultaneously release the pull upon the reins. Such means comprise a flexible brake element or cable 28, having its rear end attached to the body 7 as indicated at 29. The forward end of the backing cable 28 is attached to the shaft 9 at 30, and is adapted to be wound upon the shaft 9 in opposite directions when the shaft is rotated in opposite directions, whereby when the wagon is backed, with the brakes applied, the brake pulleys 13 are rotated clockwise, and the cable 28 wound upon the transverse shaft 9, drawing the shaft rearwardly, and increasing the frictional engagement between the brake pulleys 13 and the rear walls 5. Simultaneously with the winding of the brake cable 28 upon the shaft 9, the line cable 24 is unwound therefrom, releasing the pull upon the reins. The slack in the line 24 is double the slack in line 28. When the wagon is traveling down hill, with the brakes set by the operation of the lever 15, and it is desired to increase the application of the brakes, the hook 25 is placed upon a hook 31 preferably rigidly attached to the rear portion of the seat 8. Upon the rotation of the wheels 5 during the forward travel of the wagon down hill, the brake pulleys 13 will be rotated counterclockwise, winding the line cable 24 thereon, until this line cable has all of its slack taken up whereby the shaft 9 is held against rotation and being held in engagement with the wheels 5 by means of the lever 15 and associated elements will serve as an ordinary non-rotatable brake shoe.

In view of the foregoing description it is thought that no further explanation of the invention is necessary.

Having described the invention what I claim is:

The combination with a vehicle body, wheels therefor, and a seat rigidly mounted upon the forward portion of the body; of vertically swinging bearings arranged near and in advance of the rear wheels; a transverse rotatable shaft journaled through the bearings; brake pulleys carried by the shaft to rotate therewith; a pulley secured to the lower side of the body rearwardly of the shaft; a cable pivotally connected with the shaft, passed about the said pulley and extended forwardly of the seat; a manually operated lever connected with the body forwardly and near the seat and attached to the cable; a hook attached to the rear portion of the seat; a second cable connected with the shaft to be wound thereon and extending forwardly and having a loop element for detachable connection with the hook whereby when a sufficient amount of the second named cable is wound upon the shaft said second named cable will positively prevent further rotation of the shaft; and means for permanently connecting the lines with the second named cable.

In testimony whereof I affix my signature in presence of two witnesses.

CHAUNCEY M. SINGLETON.

Witnesses:
 MARY E. FAIRCHILD,
 EMMA J. HEDGES.

Copies of this patent may be obtained for five cents each, by addressing the "Commissioner of Patents, Washington, D. C."